(12) United States Patent
Pursifull

(10) Patent No.: US 10,570,829 B2
(45) Date of Patent: Feb. 25, 2020

(54) METHODS AND SYSTEM FOR A COMMON ASPIRATOR VALVE

(71) Applicant: Ford Global Technologies, LLC, Dearborn, MI (US)

(72) Inventor: Ross Dykstra Pursifull, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 14 days.

(21) Appl. No.: 15/674,652

(22) Filed: Aug. 11, 2017

(65) Prior Publication Data

US 2019/0048805 A1 Feb. 14, 2019

(51) Int. Cl.

| | |
|---|---|
| *F02D 9/08* | (2006.01) |
| *B60T 13/72* | (2006.01) |
| *F02D 41/00* | (2006.01) |
| *B60R 16/08* | (2006.01) |
| *B60T 15/00* | (2006.01) |
| *F02M 35/10* | (2006.01) |
| *F02M 35/104* | (2006.01) |
| *F02D 41/18* | (2006.01) |

(52) U.S. Cl.
CPC .............. *F02D 9/08* (2013.01); *B60R 16/08* (2013.01); *B60T 13/72* (2013.01); *B60T 15/00* (2013.01); *F02D 41/0007* (2013.01); *F02M 35/104* (2013.01); *F02M 35/10222* (2013.01); *F02M 35/10229* (2013.01); *F02M 35/10255* (2013.01); *F02D 41/18* (2013.01); *F02D 2250/41* (2013.01)

(58) Field of Classification Search
CPC .......... F02M 35/10255; F02M 25/089; F02M 25/0854; F02M 35/10039; F02M 26/10; B60T 13/46; B60T 17/04; B60T 13/72; F02D 2250/41; F02D 9/02; F02D 2009/024
See application file for complete search history.

(56) References Cited

U.S. PATENT DOCUMENTS

| | | | |
|---|---|---|---|
| 5,117,797 A | 6/1992 | Telep et al. | |
| 8,783,231 B2 | 7/2014 | Leone | |
| 9,435,300 B2 * | 9/2016 | Pursifull | .......... F02M 35/10229 |
| 9,581,060 B2 * | 2/2017 | Fletcher | .................. B60T 17/02 |
| 2014/0165931 A1 * | 6/2014 | Pursifull | .......... F02M 35/10229 |
| | | | 123/2 |
| 2015/0040852 A1 * | 2/2015 | Pursifull | .......... F02M 35/10118 |
| | | | 123/184.56 |
| 2015/0114348 A1 * | 4/2015 | Pursifull | .......... F02M 35/10229 |
| | | | 123/403 |

(Continued)

*Primary Examiner* — Carl C Staubach
(74) *Attorney, Agent, or Firm* — Geoffrey Brumbaugh; McCoy Russell LLP

(57) ABSTRACT

Methods and systems are provided for controlling air flow through at least two aspirators coupled across an intake throttle. In one example, a method includes, during a first condition, opening a common aspirator shut-off valve to direct intake air through a first aspirator and a second aspirator each coupled across an intake throttle, and supplying vacuum generated by the first aspirator and the second aspirator to respective vacuum consumption devices as demanded. The method also includes, responsive to a second condition, closing the common aspirator shut-off valve and supplying intake manifold vacuum to the respective vacuum consumption devices as demanded.

19 Claims, 6 Drawing Sheets

(56) References Cited

U.S. PATENT DOCUMENTS

| | | | | |
|---|---|---|---|---|
| 2015/0114350 A1* | 4/2015 | Pursifull | .......... | F02M 35/10019 |
| | | | | 123/445 |
| 2015/0159601 A1* | 6/2015 | Luehrsen | ......... | F02M 35/10118 |
| | | | | 123/564 |
| 2015/0204283 A1* | 7/2015 | VanDerWege | ... | F02M 35/10144 |
| | | | | 123/445 |
| 2016/0341132 A1* | 11/2016 | Pursifull | .......... | F02M 35/10118 |
| 2016/0369718 A1* | 12/2016 | Pursifull | ................ | F01M 13/00 |
| 2017/0009679 A1 | 1/2017 | Pursifull et al. | | |
| 2017/0107955 A1* | 4/2017 | Matsushima | ............. | F02D 9/02 |

\* cited by examiner

METHODS AND SYSTEM FOR A COMMON ASPIRATOR VALVE

FIELD

The present description relates generally to methods and systems for controlling vacuum actuator systems with an aspirator shut-off valve in boosted engines.

BACKGROUND/SUMMARY

Automotive engines may have vacuum-utilizing systems (also referred to as vacuum consumption devices) coupled to the engine intake system, which may include a crankcase ventilation system for venting blow-by gases into the intake manifold, a fuel vapor purge system for purging fuel vapors from fuel vapor canister into the intake manifold, and a brake booster which utilizes vacuum from the engine intake to boost the force applied by the pedal (or other vacuum actuators). In order to regulate the flow of gases from each of the vacuum-utilizing system during various engine operating conditions, one or more aspirators may be coupled to each of the vacuum consumption devices to generate vacuum and increase the purging efficiency of the vacuum consumer.

One example approach to supply vacuum to a vacuum consumption device (e.g., a crankcase in a turbocharged engine) is shown by Pursifull et al. in U.S. Patent Application No. 2016/0341132. Therein, at least two valved aspirators are positioned in respective bypass passages around an intake throttle in order to generate vacuum for a brake booster. The valves controlling flow through the aspirators may be controlled separately to generate desired vacuum via the aspirators while also preventing throttle bypass during low intake air flow conditions.

The inventors herein have recognized a potential issue with the example approach described by Pursifull. As an example, separately controlling the at least two valves controlling flow through the aspirators may be complex and costly. Further, if other aspirators are present across the throttle (e.g., to generate vacuum for additional vacuum consumers such as a fuel vapor purge system), additional valves are needed to prevent throttle bypass, further increasing cost and complexity of the system.

The inventors herein have identified an approach to at least partly address the above issue. In one example, the issues described above may be addressed by a method including, during a first condition, opening a common aspirator shut-off valve to direct intake air through a first aspirator and a second aspirator each coupled across an intake throttle, and supplying vacuum generated by the first aspirator and the second aspirator to respective vacuum consumption devices as demanded. The method also includes responsive to a second condition, closing the common aspirator shut-off valve and supplying intake manifold vacuum to the respective vacuum consumption devices as demanded.

As one example, the first condition may include shallow intake manifold vacuum (e.g., as observed during boosted engine conditions) and the second condition may include deep intake manifold vacuum. In this way, air flow through each of the aspirators may be provided by opening the aspirator shut-off valve during shallow vacuum conditions where intake manifold vacuum is not sufficient to operate the vacuum consumers, while air flow around the intake throttle may be prevented by closing the aspirator shut-off valve during low air flow conditions, all with a single common aspirator shut-off valve. By doing so, system cost and complexity may be reduced.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
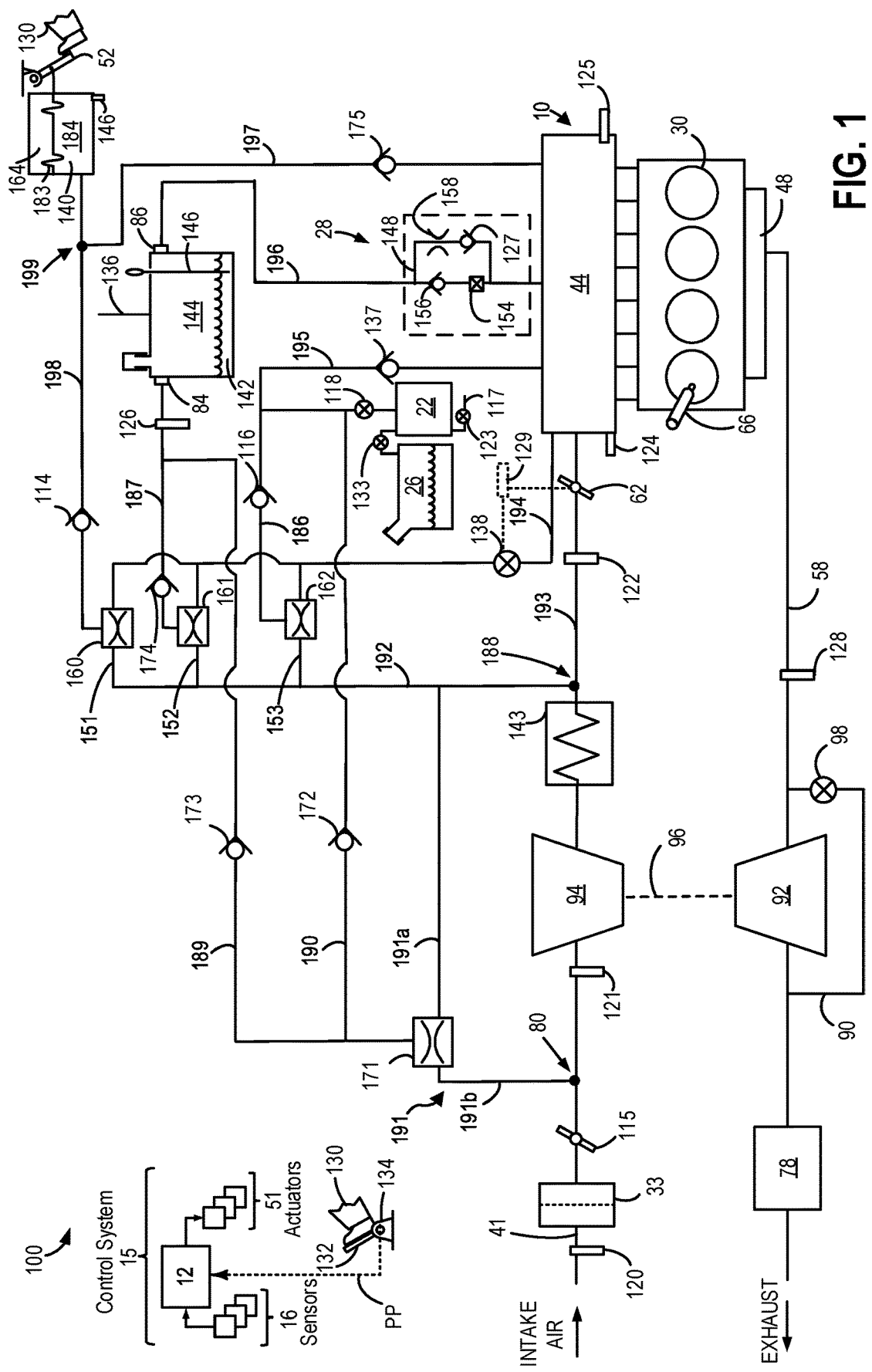
FIGS. 1-2 schematically show example engine systems with a single aspirator shut-off valve, in accordance with the present disclosure.
Figure 2:
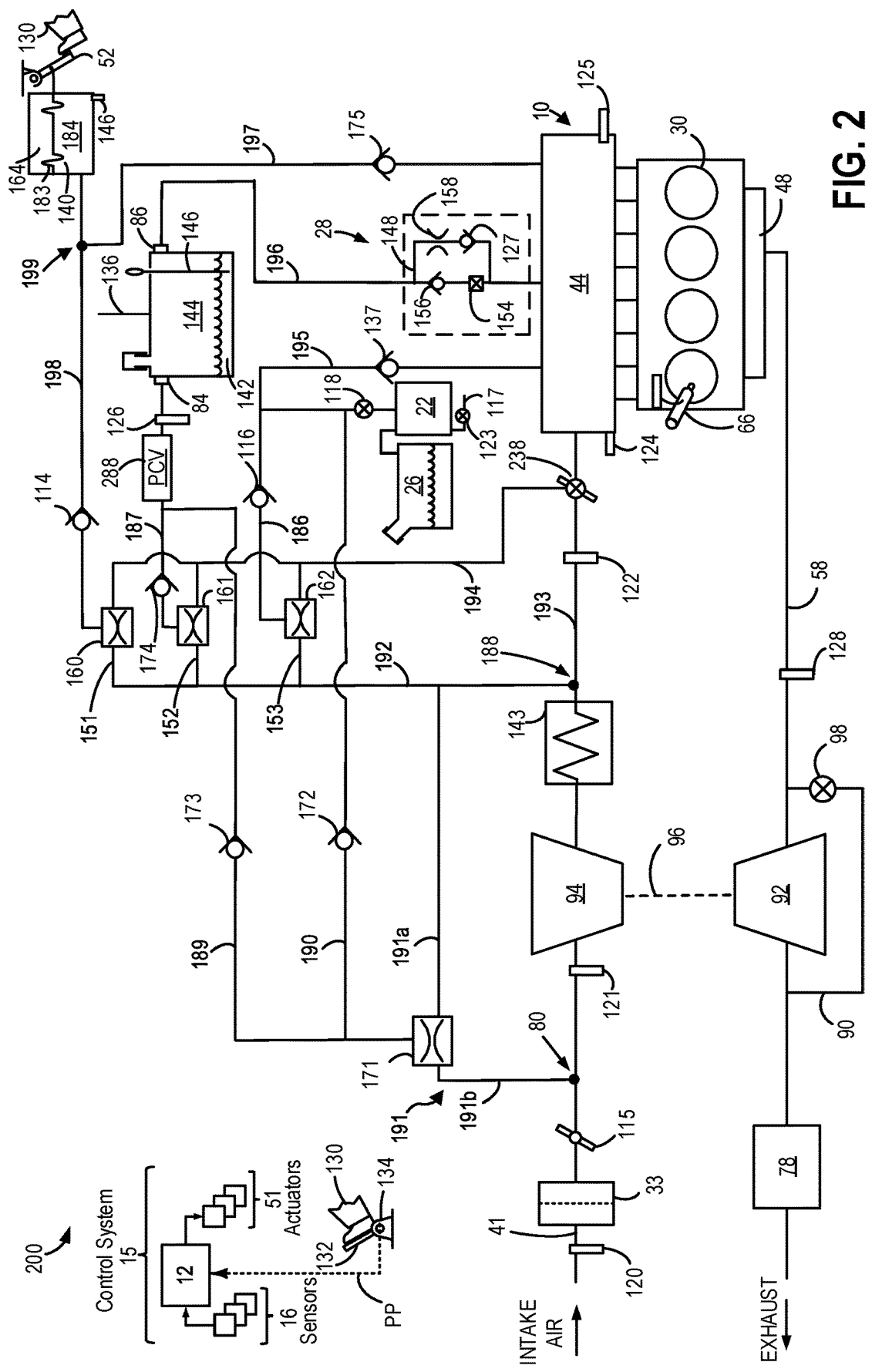
Figure 3:
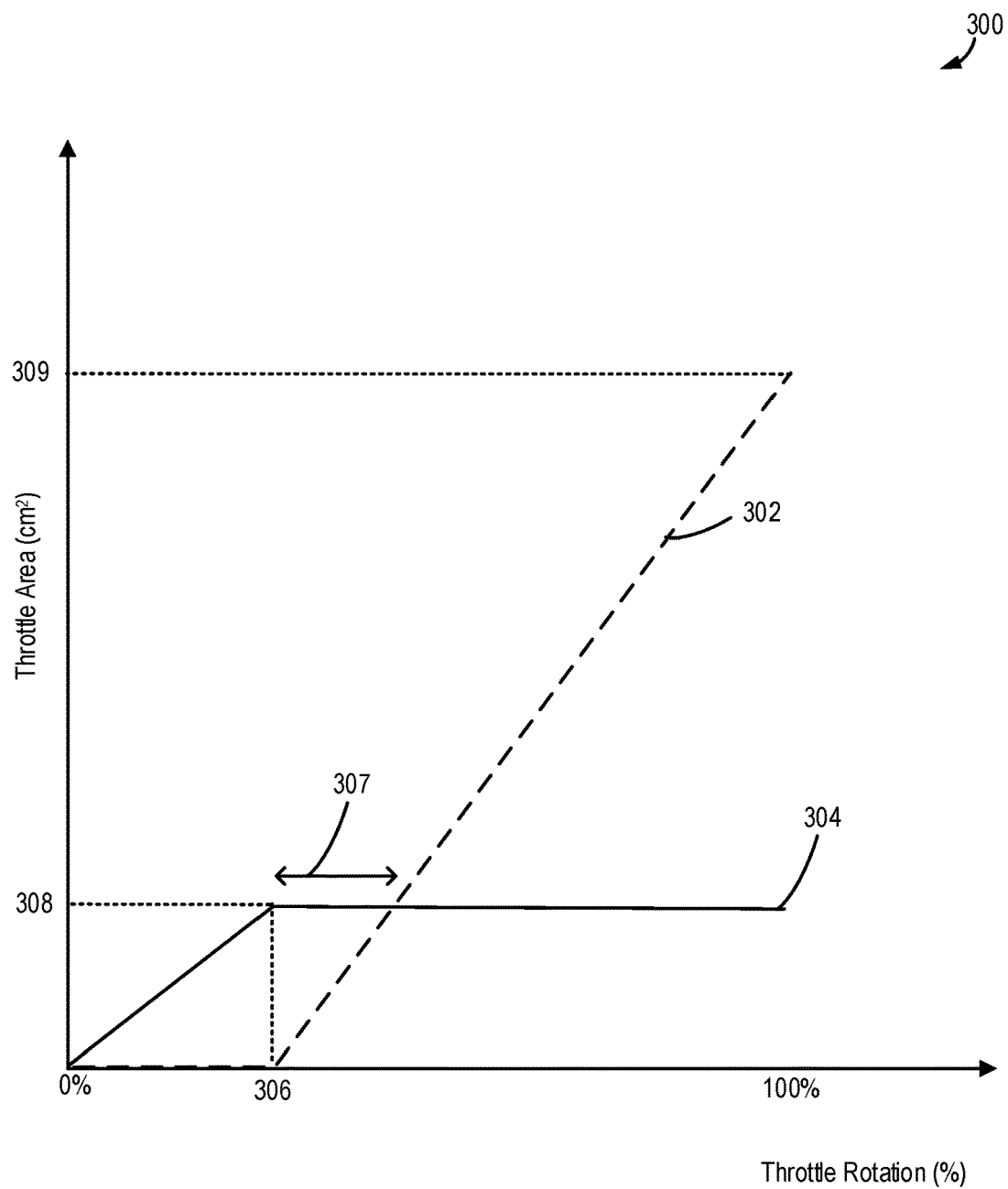
FIG. 3 shows a diagram depicting effective throttle area as a function of throttle position.
Figure 4:
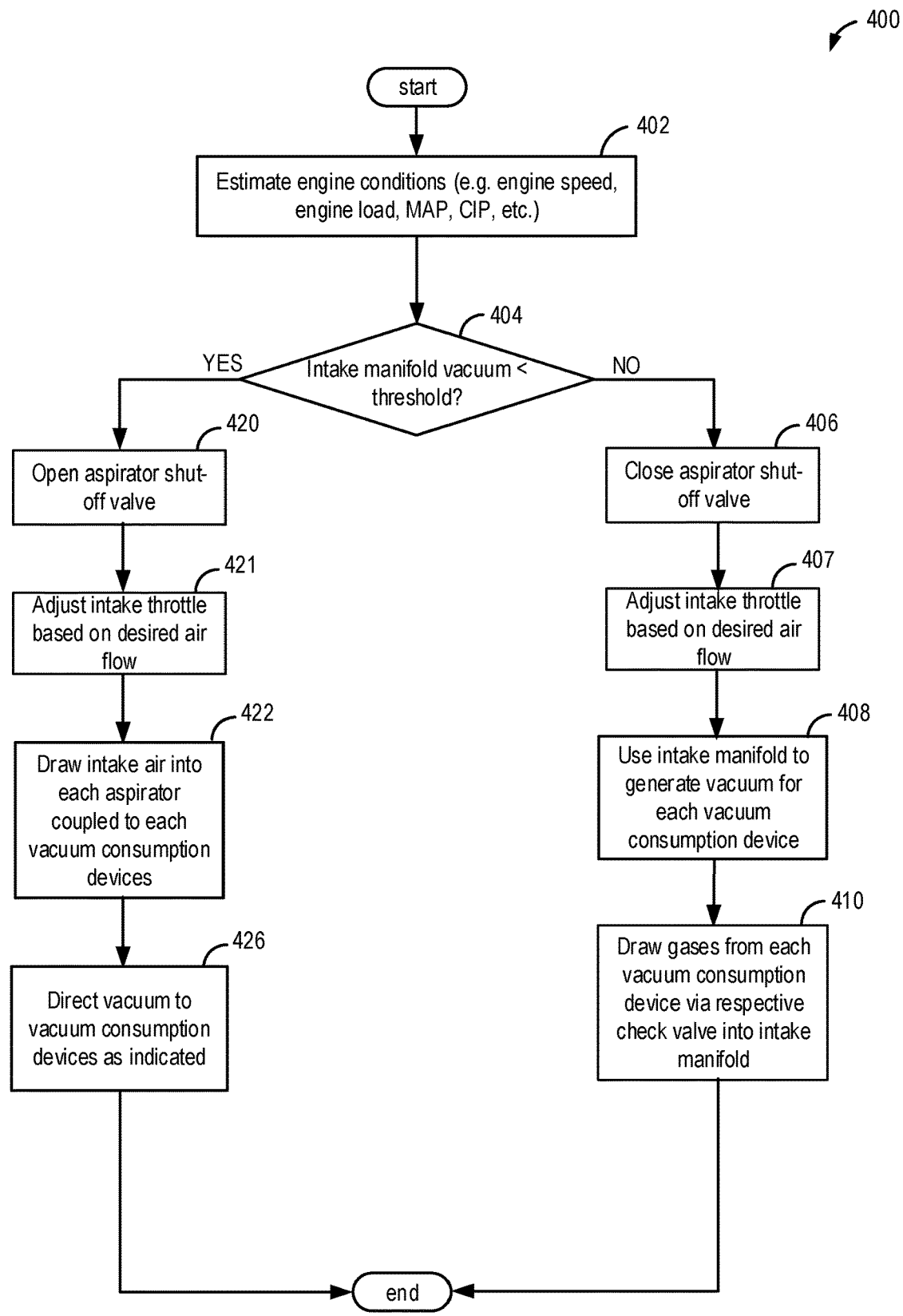
FIG. 4 shows an example routine for operating a single aspirator shut-off valve in the engine system of FIG. 1.
Figure 5:
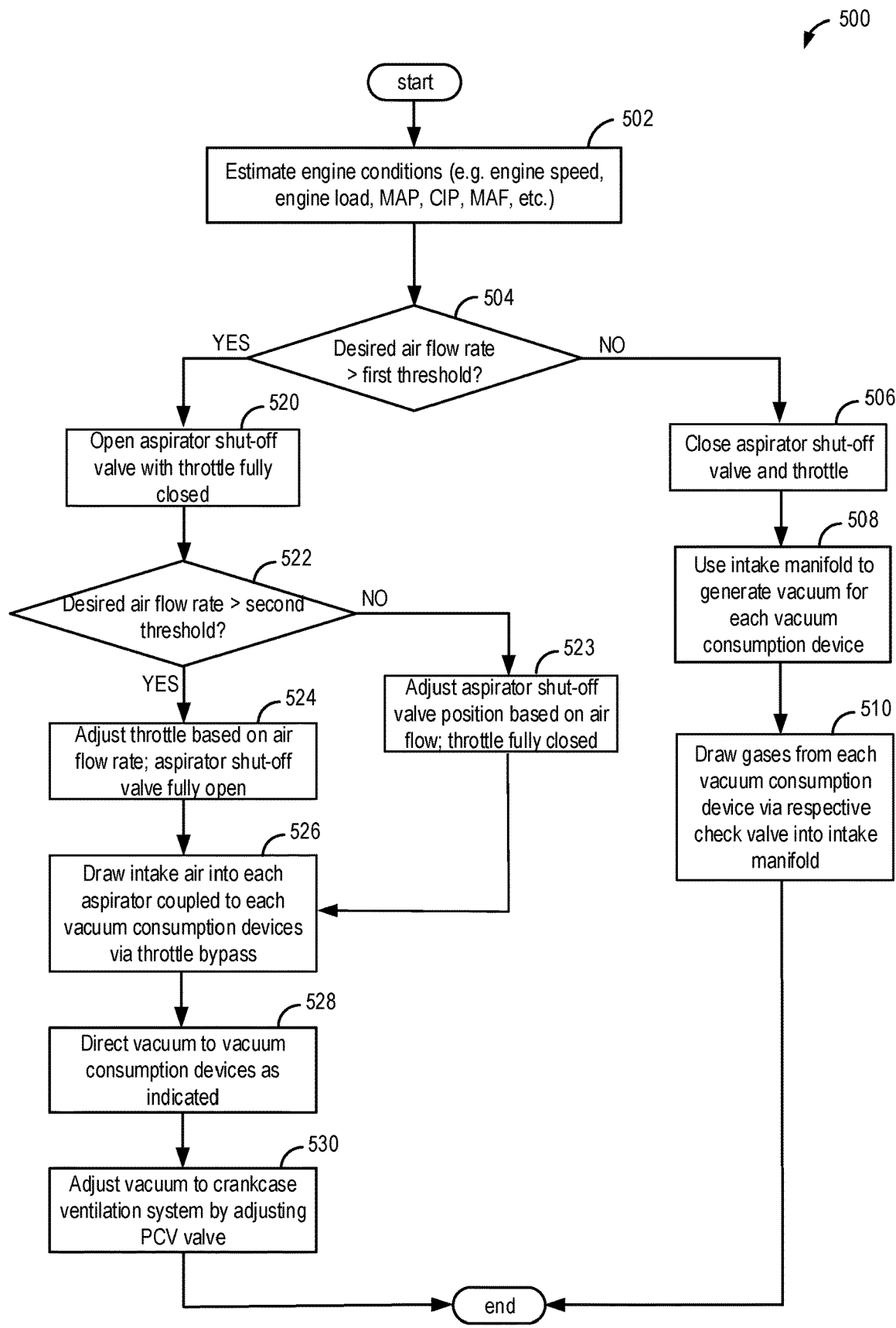
FIG. 5 shows an example routine for operating a single aspirator shut-off valve in the engine system of FIG. 2.

The following description relates to systems and methods for controlling air flow in the vacuum generation systems of a vehicle engine, such as the example engine systems shown in FIGS. 1-2. The engine systems may include a single aspirator shut-off valve (FIG. 1) or a combined aspirator shut-off valve and intake throttle, e.g., in the form of a three-way valve (FIG. 2) to control airflow during different engine operating conditions. An example diagram illustrating effective throttle area as a function of throttle position (including aspirator shut-off valve position) in the engine system of FIGS. 1-2 is illustrated in FIG. 3. Example aspirator shut-off valve adjustments are illustrated in FIGS. 4-5. A prophetic engine operation is shown with reference to FIG. 6. By adjusting the aspirator shut-off valve during selected engine operating conditions, vacuum generation for each vacuum consumption device may be provided, while engine air flow demands may be met without the need for additional valves, thus lowering component costs and engine complexity.

Regarding terminology used throughout this detailed description, a pressure rise in the crankcase indicates an increase in positive pressure (e.g., relative to barometric pressure) unless specified. Further, the term "vacuum" is used to indicate negative pressure (e.g., relative to barometric pressure).

Referring now to FIG. 1, it shows aspects of an example engine system 100 which may be included in an automotive vehicle. Engine system 100 includes a multi-cylinder internal combustion engine 10 which may propel the automotive vehicle. Engine 10 may be controlled at least partially by a control system 15 including a controller 12 and by input from a vehicle operator 130 via an input device 132. In this example, input device 132 includes an accelerator pedal and a pedal position sensor 134 for generating a proportional pedal position signal PP.

Engine system 100 may receive intake air via intake passage 41. As shown at FIG. 1, intake passage 41 may include an air filter 33 (also termed air cleaner 33) and an air induction system (AIS) throttle 115. The position of AIS throttle 115 may be adjusted via a throttle actuator (not shown) communicatively coupled to controller 12. The AIS throttle 115 may be an optional component.

Engine 10 also includes an intake throttle 62 arranged downstream of compressor 94 fluidically coupled to the intake manifold 44. Intake throttle 62 may include a throttle plate and a position of the intake throttle 62 (specifically, a position of the throttle plate) may be varied by controller 12 via a signal provided to an electric motor or actuator included with intake throttle 62, a configuration that is commonly referred to as electronic throttle control (ETC). In this manner, intake throttle 62 may be operated to vary an amount of intake air provided to intake manifold 44 and the plurality of cylinders therein.

A barometric pressure sensor 120 may be coupled at an inlet of intake passage 41 for providing a signal regarding atmospheric or barometric pressure (BP). A compressor inlet pressure (CIP) sensor 121 may be coupled to intake manifold 44 to provide a signal regarding pressure of air entering compressor 94. Further, a throttle inlet pressure (TIP) sensor may be coupled immediately upstream of intake throttle 62 for providing a signal regarding throttle inlet pressure or boost pressure. Further still, a manifold air pressure sensor 124 may be coupled to intake manifold 44 for providing a signal regarding manifold air pressure (MAP) to controller 12. Optionally, a manifold airflow sensor 125 may also be coupled to intake manifold 44 for providing a signal regarding manifold air flow (MAF) to controller 12.

Intake manifold 44 is configured to supply intake air or an air-fuel mixture to a plurality of combustion chambers 30 (also termed, cylinders 30) of engine 10. Each of the plurality of cylinders 30 may include a corresponding piston reciprocating within (not shown). The combustion chambers 30 may be arranged above a lubricant-filled crankcase 144 such that reciprocating pistons of the combustion chambers rotate a crankshaft (not shown) located in the crankcase 144. Crankcase 144 in FIG. 1 is depicted away from cylinders 30 for simplifying the description of the embodiment.

Combustion chambers 30 may be supplied one or more fuels via fuel injectors 66. Fuels may include gasoline, alcohol fuel blends, diesel, biodiesel, compressed natural gas, etc. Fuel may be supplied to the combustion chambers via direct injection (as shown in FIG. 1), port injection, throttle valve-body injection, or any combination thereof. It will be noted that a single fuel injector 66 is depicted in FIG. 1 and though not shown, each combustion chamber 30 may be coupled with a respective fuel injector 66. In the combustion chambers, combustion may be initiated via spark ignition and/or compression ignition. Unburned fuel and other combustion products may escape past each piston from cylinders 30 into crankcase 144. The resulting gases in the crankcase, often referred to as "blow-by" gases, may contribute to the formation of sludge in the engine oil supply. Further, blow-by gases may excessively pressurize the crankcase 144, resulting in undesirable leakage of an oil pan gasket and crankcase seals. To reduce these issues, engine 10 may include a crankcase ventilation (CV) system, which serves to vent blow-by gases from the crankcase 144 to either intake manifold 44 or to aspirator 161. Further details of the CV system will be provided below.

Exhaust gases from combustion chambers 30 may exit engine 10 via an exhaust manifold 48 along exhaust passage 58 into an emission control device 78 coupled to the exhaust passage 58. Exhaust gas sensor 128 is shown coupled to exhaust passage 58 upstream of emission control device 78. Sensor 128 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Emission control device 78 is shown arranged along exhaust passage 58 downstream of exhaust gas sensor 128 and exhaust turbine 92. Device 78 may be a three way catalyst (TWC), NOx trap, various other emission control devices, or combinations thereof.

Engine 10 may further include a compression device such as a turbocharger or supercharger including at least the compressor 94 arranged in intake passage 41. For a turbocharger, compressor 94 may be at least partially driven by an exhaust turbine 92 (e.g., via a shaft) arranged along exhaust passage 58. Compressor 94 draws air from intake passage 41, compresses the air and supplies the pressurized air to boost chamber 193. Boost chamber 193 is arranged between compressor 94 and intake throttle 62 (boost chamber 193 may include an expanded volume or other extension of the intake passage and thus the intake passage 41 may include the boost chamber 193 and/or the intake passage 41 may be understand to comprise the boost chamber 193, at least in some examples). As such, each of compressor 94 and charge air cooler 143 are positioned upstream of intake throttle 62. The charge air cooler 143 cools the compressed air received from compressor 94, and the cooled air then flows via intake throttle 62 to intake manifold 44, depending on the position of throttle plate of intake throttle 62.

Exhaust gases exiting combustion chambers 30 and exhaust manifold 48 spin exhaust turbine 92 which is coupled to compressor 94 via shaft 96. For a supercharger, compressor 94 may be at least partially driven by the engine and/or an electric machine (not shown), and may not include an exhaust turbine. The amount of compression provided to one or more cylinders of the engine via a turbocharger or supercharger may be varied by controller 12. TIP sensor 122 may be coupled to boost chamber 193 downstream of compressor 94 for providing a signal of boost pressure to controller 12.

A wastegate 98 may be coupled across exhaust turbine 92. Specifically, wastegate 98 may be included in a bypass passage 90 coupled between an inlet and outlet of the exhaust turbine 92. By adjusting a position of wastegate 98 via controller 12, an amount of boost provided by the turbocharger may be controlled.

First aspirator 171 is shown coupled in compressor bypass passage 191 across from compressor 94. Compressor bypass passage 191 includes a first passage 191a and a second passage 191b, with first aspirator 171 fluidically coupling first passage 191a to second passage 191b. First passage 191a is fluidically coupled to boost chamber 193 at location 188 downstream of compressor 94 and charge air cooler 143, and upstream of intake throttle 62. Thus, first passage 191a enables fluidic communication between the motive inlet of first aspirator 171 to boost chamber 193. Likewise, second passage 191b is fluidically coupled to intake manifold 44 at location 80 upstream of compressor 94 and downstream of optional AIS throttle 115 (and downstream of air cleaner 33). Therefore, second passage 191b of compressor bypass passage 191 fluidically couples the motive outlet of first aspirator 171 to intake manifold 44. Thus, first aspirator 171 may receive pressurized air as motive flow and may discharge de-pressurized air to an inlet of compressor 94 at location 80.

Compressor bypass passage 191 may divert a portion of compressed air from downstream of compressor 94 (and upstream of intake throttle 62) to upstream of compressor 94 via first aspirator 171. The portion of compressed air diverted from downstream of compressor 94 may flow into first passage 191a of compressor bypass passage 191 from location 188. This portion of compressed air may then stream through first aspirator 171 and may exit into intake passage 41 downstream of AIS throttle 115 via second passage 119b of compressor bypass passage 191.

Compressor bypass passage 191 may optionally include a compressor bypass valve (CBV, not shown) to regulate flow of compressed air along compressor bypass passage 191. By opening CBV and diverting compressed air into compressor bypass passage 191, boost chamber 193 may be depressurized during a rapid transition from a higher engine air flow rate to a lower engine air flow rate, such as during a tip-out condition. In another example, during a boost pressure build-up period, the CBV may be opened to expedite boost pressure build-up (and thereby reduce turbo lag). Thus, by controlling the CBV, the amount of air being diverted through the compressor bypass passage 191 may be varied and allow better regulation of boost pressure provided downstream of compressor 94.

Alternatively, a compressor bypass valve and tubing may be placed in parallel with compressor bypass path 191, connecting between 188 and 80.

As depicted in FIG. 1, compressor bypass passage 191 may divert a portion of compressed air from downstream of charge air cooler 143 and upstream of intake throttle 62 to the inlet of compressor 94.

In order to provide vacuum for vacuum reservoirs and vacuum consumption devices (such as crankcase 144, fuel vapor canister 22, and brake booster 184), a plurality of aspirators and check valves are positioned in parallel, each coupled to the respective vacuum consumption devices (which will be elaborated in details below). In the depicted example, the first compressor bypass passage 191a is fluidly connected to conduit 192 which branches off to three other passages: passage 151, passage 152, and passage 153. Each of the passages 151, 152, and 153 is coupled to a vacuum consumption device, such that passage 151 is coupled to brake booster 184 via aspirator 160, passage 152 is coupled to crankcase 144 via aspirator 161, and passage 153 is coupled to fuel vapor canister 22 via aspirator 162. Further, each of the passages 151, 152, and 153, downstream of their respective aspirator, is merged to a common ventilation line 194. A single aspirator shut-off valve 138 is positioned in the common ventilation line 194 to control the airflow into the intake manifold 44. In this way, when the aspirator shut-off valve 138 is opened, vacuum may be generated at each of the aspirators coupled to each of the vacuum consumption devices.

Specifically, when the aspirator shut-off valve 138 is opened, airflow from the boost chamber 193 (downstream of compressor 94 and charge air cooler 143) may be diverted into conduit 192, which may then be split up and passed through aspirator 160 (coupled to brake booster 184), aspirator 161 (coupled to crankcase 144), and aspirator 162 (coupled to fuel vapor canister 22), and eventually merged into common ventilation line 194 before entering intake manifold 44. The motive flow through each of the aspirators 160, 161, and 162 generates a suction flow at the inlet of the aspirator, thereby generating vacuum which may then be used to draw gases from each of the vacuum consumption devices, including brake booster 184, crankcase 144, and fuel vapor canister 22, respectively. Further, when the intake airflow rate is low, such as during idle, aspirator shut-off valve 138 may be actuated to a closed position in order to prevent intake air from bypassing intake throttle 62. Thus, conduit 192, passages 151, 152, 153, and common ventilation line 194 may be referred to as a throttle bypass passage. By controlling the airflow through opening/closing aspirator shut-off valve 138, vacuum may be generated at each of the aspirators while allowing desired engine intake air flow at low air flow rates.

Aspirator shut-off valve 138 may be an electrically actuated valve and its opening/closing state may be controlled by controller 12 based on manifold pressure and/or desired intake air flow. Further, aspirator shut-off valve 138 may be either a binary valve (e.g., on-off valve) or a continuously variable valve. Binary valves may be controlled either fully open or fully closed, such that a fully open position of a binary valve is a position in which the valve exerts no or a minimal flow restriction, and a fully closed position of a binary valve is a position in which the valve restricts all flow such that no flow may pass through the valve. In contrast, continuously variable valves may be fully open, fully closed, and/or partially opened to varying degrees. In one example, aspirator shut-off valve 138 may be further configured to close at deep manifold vacuum and open at shallow manifold vacuum. In one example, aspirator shut-off valve 138 may be opened at low/shallow manifold vacuum, such as when manifold vacuum is less than 20 kPa. In another example, the aspirator shut-off valve 138 may be closed when the manifold vacuum is high, such as when the vehicle is in idle condition.

Engine system 100 may include a brake booster 184 coupled to vehicle wheel brakes (not shown). Brake booster 184, including a brake booster vacuum reservoir 140, may be coupled to intake manifold 44 via check valve 175 through passage 197. Check valve 175 allows air to flow to intake manifold 44 from brake booster 184 and limits air flow to brake booster 184 from intake manifold 44. Brake booster 184 may include a vacuum reservoir 140 (or vacuum cavity) behind a diaphragm 183 of the brake booster for amplifying a force provided by a vehicle operator 130 via a brake pedal 52 for applying vehicle wheel brakes (not shown). In one embodiment, the brake pedal 52 may be mechanically coupled to the brake booster 184. Depression of the brake pedal 52 may open a valve in the brake booster 184 (not shown) allowing outside air to flow into working chamber 164 of the brake booster 184. As such, the force applied to the brake pedal 52 may be amplified by the brake booster 184, reducing the amount of force required by the vehicle operator 130 to depress the brake pedal 52. A vacuum level at brake booster 184 (or a pressure in the brake booster) may be estimated by pressure sensor 146. Brake booster 184 works by using a pressure difference across the diaphragm 183. By allowing atmospheric air to enter the working chamber 164, a differential pressure may be formed across diaphragm 183, and a force may be created to assist the force applied to brake pedal 52.

Vacuum reservoir 140 may also receive vacuum from aspirator 160 or intake manifold 44. In particular, when the aspirator shut-off valve 138 is open, such as during boosted conditions, a portion of intake air may flow from upstream of intake throttle 62 at location 188 into aspirator 160 via conduit 192. While flowing through conduit 192, the air may pass through aspirator 160, generating vacuum at the aspirator's vacuum inlet. A portion of intake air may be diverted through aspirator 160, and consequently a vacuum generated at aspirator 160 may be controlled by aspirator shut-off valve 138. Further, a check valve 114 coupled between the aspirator's vacuum inlet and brake booster 184 may prevent backflow of gases from the aspirator 160 towards brake booster reservoir 140. In one example, aspirator 160 may have a flow rate of 3 g/s.

In the depicted embodiment, engine system may also include a ventilation crankcase 144 coupled to intake manifold 44, which serves to regulate flow of blow-by gases from the crankcase to the intake manifold. Crankcase 144 is coupled to aspirator 161 via conduit 187. Conduit 187 may be termed a suction path. Further, the inlet port of aspirator 161 is fluidly connected to the boost chamber 193 via passage 152 and conduit 192, while the outlet port of aspirator 161 is fluidly connected to common ventilation line 194 which leads to intake manifold 44. In one example, aspirator 161 may have a flow rate of 0.5 g/s. Check valve 174 is positioned between crankcase 144 and aspirator 161 to allow airflow in one direction, from crankcase 144 to the boost chamber 193 upstream of intake throttle 62. Specifically, oil separator 84 of crankcase 144 is fluidically coupled to aspirator 161 via conduit 187. Oil separator 84 may be termed a second port of crankcase 144. Oil particles present in blow-by gases (also termed crankcase vapors) in crankcase 144 may be selectively filtered via each of oil separators 84 and 86 as these crankcase vapors exit the crankcase. Sensor 126 coupled in conduit 187 provides a signal of crankcase pressure to controller 12. While sensor 126 is shown coupled along conduit 187, other embodiments may place sensor 126 at other locations for sensing crankcase pressure. As depicted in FIG. 1, oil separator 84 of crankcase 144 is also coupled fluidically to intake manifold 44 via aspirator bypass passage 189. Further, check valve 173 coupled along aspirator bypass passage 189 ensures that airflow is flowing in one direction from crankcase 144 into intake manifold 44. Crankcase 144 further includes a fresh air conduit 136. During non-boosted conditions (when manifold pressure (MAP) is less than barometric pressure (BP)), the crankcase ventilation system draws air into crankcase 144 via the fresh air conduit 136. Fresh air conduit 136 may be coupled to the intake passage upstream of the compressor. In some examples, fresh air conduit 136 may be coupled downstream of the air filter, while in other examples, it may be coupled upstream of the air filter.

Further, aspirator 171 coupled to the compressor bypass passage may also be another source of vacuum for drawing air out of the crankcase 144. Depending on the airflow rate through aspirator 171 versus aspirator 161, gases from crankcase 144 may be drawn via aspirator 161 through common ventilation line 194 or via aspirator 171 through compressor bypass passage 191. In one example, if the airflow rate in the compressor bypass passage is higher than the airflow rate through aspirator 161 in the throttle bypass passage (e.g., if airflow through aspirator 171 is higher than 0.5 g/s), then more vacuum may be generated by aspirator 171 and gases from crankcase 144 may be drawn via aspirator 171 into intake passage 41 through compressor bypass passage 191. However, if the airflow rate through aspirator 161 is higher than high air flow rate through aspirator 171, then gases from crankcase 144 may be drawn out via vacuum generated via aspirator 161 into common ventilation line 194 (provided that aspirator shut-off valve 138 is in open position) which then allows the gases to flow into the intake manifold 44.

Under non-boosted condition, such as when vehicle is in idle mode, the intake manifold vacuum pressure may be less than atmospheric pressure (i.e. MAP<BP). In other words, the intake manifold is in deep vacuum condition. Under this condition, the vacuum present within the intake manifold 44 may be sufficient to draw air from crankcase 144 into the intake manifold. Fuel vapors from crankcase 144 may be drawn into the intake manifold via passage 197 passively whenever pressure within the intake manifold is lower than the pressure within crankcase 144.

Crankcase 144 includes lubricating oil 142 and a dipstick 146 for measuring a level of oil 142 within crankcase 144. Crankcase 144 fluidically communicates with intake manifold 44 via crankcase ventilation passage 196 which includes crankcase ventilation (CV) valve 28 coupled therein. Thus, the CV system may include CV valve 28 intermediate the crankcase 144 and the intake manifold 44, to regulate the flow of blow-by gases from the crankcase to the intake manifold. As such, crankcase ventilation may occur along crankcase ventilation passage 196 (also termed crankcase ventilation passage 196) and CV valve 28 during engine conditions when pressure in intake manifold 44 is lower than barometric pressure (or lower than CIP). Specifically, vapors from crankcase 144 may exit crankcase 144 via oil separator 86 (termed first port of crankcase herein) into crankcase ventilation passage 196, and thereon through CV valve 28 (e.g., via check valve 156 and PCV valve 154) into intake manifold 44.

CV valve 28 is schematically illustrated as a passive valve switching between a reverse flow path 148 including reverse flow orifice 158 and a forward flow path including a pneumatically-controlled positive crankcase ventilation (PCV) valve 154. Crankcase ventilation (CV) flow along the forward flow path through PCV valve 154 may largely occur during conditions when pressure in intake manifold 44 is lower than CIP. CV flow along the forward flow path includes flow of crankcase gases from crankcase 144 towards intake manifold 44 via crankcase ventilation passage 196 and PCV valve 154. During forward flow of gases from crankcase 144 into intake manifold 44, crankcase vapors may not flow through reverse flow orifice 158.

Reverse flow may occur during boosted conditions when intake manifold pressure is higher than CIP. Herein, boosted air from intake manifold 44 may flow through reverse flow orifice 158 along reverse flow path 148 and through crankcase ventilation tube 88, past oil separator 86 towards crankcase 144. Further, during reverse flow, boosted air may not flow through PCV valve 154. As the boosted air is intentionally allowed into the crankcase via the reverse flow orifice 158, positive crankcase ventilation may occur during boosted conditions of the engine. However, allowing flow of boosted air into the crankcase also contributes to crankcase pressurization during boosted conditions. Aspirator 161 may counteract crankcase pressurization at boost by drawing vapors from the crankcase enabling purging of the crankcase of various gases including humid air and fuel vapors. Condensation of water inside the crankcase may contribute to sludge formation. Thus, by reducing crankcase humidity, sludge formation within the crankcase may also be reduced. As such, the purging of fuel vapors from within the crankcase may also reduce oil dilution (e.g., fuel in oil).

CV valve 28 includes PCV valve 154 arranged in parallel with reverse flow orifice 158. PCV valve 154 may be a continuously variable valve allowing a variation in degree of opening. Reverse flow orifice 158 is included in reverse flow path 148 downstream of check valve 127. Reverse flow orifice 158 may be a low flow orifice allowing a significantly smaller flow rate therethrough. Check valve 127 is biased to allow reverse fluid flow in a direction from intake manifold 44 towards crankcase 144 and to block fluid flow from crankcase 144 to intake manifold 44.

CV valve 28 (and PCV valve 154) may be controlled by vacuum level and/or pressure in the intake manifold 44, at least in some examples. CV valve 28 further includes check valve 156. Check valve 156 is arranged in crankcase ventilation passage 196, in series with PCV valve 154, to allow the forward flow of crankcase vapors including blow-by gases only from crankcase 144 to intake manifold 44. Check valve 156 blocks air flow from intake manifold 44 to crankcase 144. PCV valve 154 may be designed to be more restrictive at higher manifold vacuums (e.g., deeper manifold vacuum) and less restrictive at lower manifold vacuums (e.g., shallow vacuum). In other words, PCV valve 154 may allow a higher flow rate therethrough when shallow vacuum levels are present in the intake manifold 44. Further, PCV valve 154 may allow a smaller flow rate therethrough when the intake manifold 44 has a deeper vacuum.

In one example, PCV valve 154 may include an internal restrictor (e.g., a cone or ball), and/or may be a spring-actuated valve. The position of the internal restrictor and thus the flow through the valve may be regulated by the pressure differential between the intake manifold and the crankcase. For example, when there is no vacuum in the intake manifold, such as during engine off conditions, a spring may keep a base of the internal restrictor seated against an end of a housing of the valve which communicates with the crankcase, such that the valve is in a fully closed position. In contrast, when there is a higher level of vacuum (e.g., deeper vacuum) in the intake manifold, such as under engine idle or deceleration conditions, the internal restrictor moves upward within the valve housing towards the intake manifold end of the valve housing due to the increase in intake manifold vacuum. At this time, PCV valve 154 is substantially closed, and crankcase vapors move through a small annular opening between the internal restrictor and the valve housing.

When intake manifold vacuum is at a lower level (e.g., shallow vacuum such as 15-50 kPa), for example during part-throttle operation, the internal restrictor moves closer to the crankcase end of the valve housing, and CV flow moves through a larger annular opening between the internal restrictor and the valve housing. At this time, PCV valve 154 is partially open. Schematically, this may be represented by a progressive opening of PCV valve 154 and an increase in CV flow.

Finally, a further decrease in intake manifold vacuum (e.g., 0-15 kPa), for example during higher load conditions, moves the internal restrictor even closer to the crankcase end of the valve housing, such that CV flow moves through an even larger annular opening between the internal restrictor and the valve housing. At this time, PCV valve 154 is considered to be fully open, such that CV flow through the valve is maximized. In this way, the opening state of PCV valve 154 is influenced by manifold vacuum, and the flow rate through PCV valve 154 increases as pressure drop across the PCV valve 154 decreases.

Reverse flow orifice 158 may, in one example, be formed as a lengthwise orifice through the length of the internal restrictor allowing a fixed amount of fluid flow to be metered through the CV valve 28 even when the CV valve is fully closed. The reverse flow orifice may be enabled as a purposeful or deliberate leak in CV valve 28 such that during boosted engine conditions when the pressure in the intake manifold is higher than barometric pressure (and/or CIP), the reverse flow orifice extending through the length of the cone may meter a smaller quantity of fresh boosted air from the intake manifold towards the crankcase enabling conduit 82 to function as a fresh air path. To elaborate, blow-by gases exiting crankcase 144 towards intake manifold 44 via conduit 82 during boosted conditions may now be combined with a smaller quantity of fresh boosted air received from intake manifold 44 via the reverse flow orifice 158 of the CV valve 28.

Thus, during boosted conditions, when intake manifold pressure (as measured by MAP sensor 124) is higher than CIP and boost pressure is higher than CIP, a nominal quantity of boosted air may flow from intake manifold 44 through CV passage 196, along reverse flow path 148 and reverse flow orifice 158, into crankcase 144. Crankcase vapors including blow-by gases may then exit crankcase 144 via oil separator 84 through conduit 187 towards location 188 and thereon into intake manifold 44. These crankcase vapors flowing through conduit 187 and passage 192 towards location 188 may also include the nominal quantity of boosted air from intake manifold 44 received in the crankcase via reverse flow orifice 158 of CV valve 28. Vacuum generated at the aspirator 161 may draw crankcase gases from crankcase 144 via conduit 187 towards suction port of aspirator 161 and merge to boost chamber 193 at location 188. Herein, crankcase gases may mix with compressed air flowing in from boost chamber 193 of compressor 94. Crankcase gases merged with compressed air from boost chamber 193 may then flow past intake throttle 62 into intake manifold 44 and into cylinders 30 for combustion.

Further, engine system 100 further includes fuel tank 26, which stores a volatile liquid fuel combusted in engine 10. To avoid emission of fuel vapors from the fuel tank and into the atmosphere, the fuel tank is vented to the atmosphere through adsorbent canister 22. The adsorbent canister may have a significant capacity for storing hydrocarbon-, alcohol-, and/or ester-based fuels in an adsorbed state; it may be filled with activated carbon granules and/or another high surface-area material, for example. Nevertheless, prolonged adsorption of fuel vapor will eventually reduce the capacity of the adsorbent canister for further storage. Therefore, the adsorbent canister may be periodically purged of adsorbed fuel, as further described hereinafter. As shown, a vapor blocking valve (VBV) 133 may be optionally included in a conduit between fuel tank 26 and adsorbent canister 22. VBV may alternatively be referred to as an isolation valve. In some embodiments, VBV 133 may be a solenoid valve, and operation of VBV 133 may be regulated by adjusting a driving signal (or pulse width) of the dedicated solenoid. During normal engine operation, VBV 133 may be kept closed to limit the amount of diurnal vapors directed to canister 22 from fuel tank 26. During refueling operations, and selected purging conditions, VBV 133 may be opened to direct fuel vapors from the fuel tank 26 to canister 22. By opening the valve during conditions when the fuel tank pressure is higher than a threshold (e.g., above a mechanical pressure limit of the fuel tanks above which the fuel tank and other fuel system components may incur mechanical damage), the refueling vapors may be released into the canister and the fuel tank pressure may be maintained below pressure limits. While the depicted example shows VBV 133 positioned in a passage between the fuel tank and canister, in alternate embodiments, the isolation valve may be mounted on fuel tank 26. The VBV may alternatively be referred to as Fuel Tank Isolation Valve (FTIV).

In the configuration shown in FIG. 1, canister-purge valve 118 controls the purging of fuel vapors from the canister into the intake manifold along purge line 186 and purge line 195. Check valve 137 coupled in purge line 195 prevents backflow from intake manifold 44 into canister 22.

When purging conditions are met, such as when the canister is saturated, vapors stored in fuel vapor canister 22 may be purged to intake manifold 44 by opening canister purge valve 118. While a single canister 22 is shown, it will be appreciated that any number of canisters may be coupled in engine system 100. In one example, canister purge valve 118 may be a solenoid valve wherein opening or closing of the valve is performed via actuation of a canister purge solenoid. Canister 22 further includes a vent 117 for routing gases out of the canister 22 to the atmosphere when storing, or trapping, fuel vapors from fuel tank 26. Vent 117 may also allow fresh air to be drawn into fuel vapor canister 22 when purging stored fuel vapors into intake manifold 44 via purge line 186, purge line 195, and purge valve 118. While this example shows vent 117 communicating with fresh, unheated air, various modifications may also be used. Vent 117 may include a canister vent valve 123 to adjust a flow of air and vapors between canister 22 and the atmosphere and/or to seal the fuel system from atmosphere during fuel system diagnostics, for example.

When BP>MAP (e.g., during non-boosted conditions), fuel vapors are drawn from canister 22 in a first direction along purge line 195 into the intake manifold 44, using intake manifold vacuum. Then, when MAP>BP (e.g., during boosted conditions), the fuel vapors may be drawn either along purge line 186 via using vacuum generated by aspirator 162 or along aspirator bypass passage 191 via vacuum generated by aspirator 171. In one example, when the aspirator shut-off valve 138 is opened, the fuel vapor from canister 22 may be purged via vacuum generated by aspirator 162 along conduit 186 into common ventilation line 194 into the intake manifold 44. Alternatively, when the airflow rate across aspirator 162 (e.g., when opening of aspirator shut-off valve 138 is small) is lower than the airflow rate across aspirator 171 such that vacuum generated across aspirator 171 is greater than aspirator 162, then fuel vapors may be purged via vacuum generated by aspirator 171 into intake passage 41 via aspirator bypass passage 190 and second compressor bypass passage 191b. In one example, the air flow rate across aspirator 162 may be 12 g/s. In this case, if the air flow across aspirator 171 is greater than 12 g/s, then fuel vapors may be purged via compressor bypass passage 191 into intake passage 41. Check valve 172 is positioned along passage 190 downstream of canister 22 in order to prevent backflow of gases into the canister. Aspirator 171 may further generate more vacuum along passage 190 such that fuel vapors may be purged into compressor bypass passage 191 via second passage 191b. The fuel vapor may then be discharged into the inlet of compressor 94 via location 80.

Engine system 100 may include a control system 15 which in turn comprises controller 12, which may be an electronic control system of the engine system or of the vehicle in which the engine system is installed. Controller 12 may be configured to make control decisions based at least partly on input from one or more sensors 16 within the engine system, and may control actuators 51 based on the control decisions. For example, controller 12 may store computer-readable instructions in memory, and actuators 51 may be controlled via execution of the instructions. Example sensors include MAP sensor 124, mass air flow (MAF) sensor (not shown), BP sensor 120, CIP sensor 121, TIP sensor 122, and crankcase pressure sensor 126. Control system 15 with controller 12 may include computer-readable instructions for controlling actuators 51. Example actuators include intake throttle 62, fuel injector 66, wastegate 98, CBV 50, AIS throttle 115, canister purge valve 118, canister vent valve 123, crankcase ventilation valve 28, aspirator shut-off valve 138, etc. As such, the controller 12 receives signals from the various sensors of FIG. 1 and employs the various actuators of FIG. 1 to adjust engine operation based on the received signals and instructions stored on a memory of the controller.

In one example, controller 12 may receive signals from manifold pressure sensor 124 coupled to intake manifold 44, and based on the vacuum level of intake manifold 44 as measured by sensor 124, controller 12 may actuate aspirator shut-off valve 138 to an open or closed position. As an example, when the intake manifold vacuum is higher than a threshold, such as when the vehicle is in idle condition, aspirator shut-off valve 138 may be actuated to a closed position in order to prevent throttle bypass. In this case, airflow from passage 192 to aspirators 160, 161, and 162, into common ventilation line 194 may be referred as throttle bypass passage. By not allowing throttle bypass, air flow rate into the intake manifold may be kept below a threshold to maintain accurate air-fuel ratio at low engine speed-load conditions. Further, since the vacuum level of intake manifold is higher than a threshold, sufficient vacuum may be generated to draw gases from each of the vacuum consumption devices into the intake manifold 44.

In an alternate embodiment, the aspirator shut-off valve 138 and intake throttle 62 may be mechanically linked (shown in dashed line) via actuator 129. Actuator 129 may be in communication with controller 12 and is controlled by controller 12 based on airflow rate within the intake system. In one example, controller 12 may provide signals to actuator 129 based on the air flow rate, measured via MAF sensor for example. Further, actuator 129 may be configured to first adjust the position of shut-off valve 138 based on the desired air flow rate and if the desired air flow rate is not satisfied by adjusting aspirator shut-off valve 138 alone, then actuator 129 may further increase airflow into the intake system by rotating the intake throttle 62. By first opening the aspirator shut-off valve and then adjusting the position of intake throttle based on the airflow demand, a desired amount of air may be provided into the intake manifold while providing vacuum during shallow manifold vacuum conditions via the aspirators 160, 161, and 162. Further, by mechanically linking the aspirator shut-off valve 138 and intake throttle 62, the above-described controls may be achieved while lowering costs and complexity. In another example, actuator 129 may be dispensed with and a mechanical linkage between intake throttle 62 and aspirator shut-off valve 138 may act to open aspirator shut-off valve 138 when intake throttle 62 is rotated among a first set of positions, and then close aspirator shut-off valve 138 when intake throttle 62 is rotated among a second, different set of positions; between the first and second set of positions, intake throttle may be open.

Aspirator 171 begins to create vacuum when air flows through the aspirator. Air flows through the aspirator when throttle inlet pressure substantially exceeds compressor inlet pressure. When throttle inlet pressure substantially exceeds compressor inlet pressure, the engine is providing significant power and brake vacuum replenishment during power generation is not the present priority. If the brakes were to be in use during this time, propulsive power may be cut.

In some examples, the vehicle in which engine system 100 is installed may be a hybrid vehicle with multiple sources of torque available to one or more vehicle wheels. In other examples, the vehicle is a conventional vehicle with only an engine, or an electric vehicle with only electric machine(s). When the vehicle is a hybrid, the vehicle includes the engine and an electric machine. The electric machine may be a motor or a motor/generator. The crankshaft of the engine and the electric machine are connected via a transmission to the vehicle wheels when one or more clutches are engaged. For example, a first clutch may be provided between the crankshaft and the electric machine, and a second clutch may be provided between the electric machine and the transmission. Controller 12 may send a signal to an actuator of each clutch to engage or disengage the clutch, so as to connect or disconnect the crankshaft from the electric machine and the components connected thereto, and/or connect or disconnect the electric machine from the transmission and the components connected thereto. The transmission may be a gearbox, a planetary gear system, or another type of transmission. The powertrain may be configured in various manners including as a parallel, a series, or a series-parallel hybrid vehicle.

The electric machine receives electrical power from a traction battery to provide torque to the vehicle wheels. The electric machine may also be operated as a generator to provide electrical power to charge the battery, for example during a braking operation.

Now turning to FIG. 2, an alternate embodiment of an engine system 200 is presented in a schematic manner. Engine system 200 is similar to engine system 100 of FIG. 1. Specifically, the difference between engine system 200 and engine system 100 is that aspirator shut-off valve 138 and intake throttle 62 of FIG. 1 are replaced with a single flow control valve 238 in FIG. 2. Flow control valve 238 may be a three-way valve which is in fluid connection with common ventilation line 194, boost chamber 193 (downstream of compressor 94 and charge air cooler 143), and intake manifold 44. Further, in order to provide control of airflow in crankcase 144, a positive crankcase ventilation (PCV) valve 288 is included and positioned between the aspirator bypass passage 189 and oil separator 84 of crankcase 144. The rest of the components previously introduced in FIG. 1 are the same and numbered similarly in FIG. 2, and not reintroduced.

Flow control valve 238 may be a continuous device which may be adjusted to a first range of positions (or to a first set of positions) to only allow airflow from common ventilation line 194 into intake manifold 44, and a second range positions (or a second set of positions) to additionally allow airflow through the intake passage/boost chamber (also referred to herein as a main bore of the flow control valve 238), which has a larger opening than an opening of the common ventilation line (also referred to herein as a small bore of the flow control valve 238). In some examples, when the flow control valve 238 is in the second position range, intake air may flow from both the common ventilation line 194 and boost chamber 193 into intake manifold 44.

In one example, when the airflow within the intake system is below a first threshold, then controller 12 may signal the actuator to adjust flow control valve 238 to a fully closed position. In the fully closed position, both the boost chamber and common ventilation line may be closed (e.g., blocked from fluidic communication with the intake manifold via the aspirator flow control valve). The first threshold may be the level of air flow rate when the vehicle is in idle, for example. Under such conditions, an idle bypass throttle may control intake air flow and the intake manifold vacuum may be sufficient to meet vacuum demand of the vacuum consumption devices.

In another example, when the airflow within the intake system is above the first threshold but lower than a second threshold (where second threshold is higher than the first threshold), then controller 12 may adjust the position of the flow control valve 238 to the first position. The second threshold may be relatively low engine air flow, such as would be observed during low engine speeds and/or loads. By adjusting flow control valve 238 to the first position, air flow may enter the throttle bypass passage, which leads to increased airflow rate across aspirators 160, 161, and 162. Vacuum is then generated within the above mentioned aspirators, which allow air from brake booster 184 and fuel vapors and/or other gases from crankcase 144 and fuel vapor canister 22 to be purged via common ventilation line 194 into intake manifold 44.

In another example, when the airflow rate within the intake system exceeds the second threshold, then controller 12 may actuate the flow control valve 238 to the second position. In this case, the air flow provided by opening the flow control valve 238 to the first position may not provide sufficient flow to meet the increased in airflow demand and thus a larger opening for the flow control valve 238 is needed. By adjusting flow control valve 238 to the second position, fresh air from the intake passage 41 may enter the intake manifold via boost chamber 193. In addition, air flow into intake manifold 44 is increased via air drawn from the various vacuum consumption devices via common ventilation line 194.

Further, a PCV valve 288 coupled to crankcase 144 may be used to better regulate air flow by restricting the flow of ventilating air during a range of engine speed/load conditions when the flow control valve is adjusted to a second position. The vacuum source occurs at variable levels and may be controlled appropriately to control the crankcase gasses ingested into the engine. In approximate terms, a ratio of crankcase gasses to fresh air is targeted (e.g. 2%).

In this way, vacuum generated via one or more aspirators may be controlled via a single shut-off valve to enhance vacuum generator during low manifold vacuum and also provide air flow control during low intake air flow conditions.

Now turning to FIG. 3, a diagram 300 illustrating effective throttle area as a function of effective throttle rotation is shown. Specifically, FIG. 3 illustrates throttle area as a function of throttle position in an engine system that includes the combined throttle and aspirator shut-off valve (e.g. flow control valve 238 of FIG. 2). Diagram 300 depicts effective throttle area (along the y-axis) as a function of percent rotation of the aspirator control valve (along the x-axis). The effective throttle area represents the area of the intake passage that is open for air flow into the intake manifold, while the effective percent rotation represents the amount of valve rotation that is needed to achieve the desired throttle area.

As described in FIG. 2, the vacuum generation of each aspirator for each of the vacuum consumption devices may be controlled based on the level of intake manifold vacuum and/or intake air flow rate via the flow control valve 238 of FIG. 2. In the depicted example, the throttle area is increased as the effective percent rotation of the flow control valve increases. The effective throttle area may be adjusted via opening the small bore of the flow control valve (shown by plot 302), which may be accomplished by rotating the flow control valve through a first percent rotation range (e.g., 0-10% rotation). Further, the throttle area may be increased via opening the main bore of the flow control valve (shown by plot 304) by rotating the flow control valve through a second percent rotation range (e.g., 10-100%).

In one example, during idle conditions, both the small bore and main bore of the flow control valve are closed, via the valve being at 0% rotation. As intake air flow demands increase, first the small bore may be opened by rotating the flow control valve from 0-10% rotation, for example. At a threshold rotation 306 (e.g., 10%), the small bore is fully open. Consequently, the throttle area is increased from 0 cm² to a relatively low area 308 as shown on plot 304. As air flow demand continues to increase, the air flow supplied into the intake manifold by the small bore may be insufficient to maintain torque. Thus, the controller may further adjust the position of the flow control valve in order to open the main bore (plot 304) from an initial position of 306, on up to a fully open position (100%) as air flow demands dictate. As a result, the throttle area further increases from the relatively small area 308 to a larger area 309, which may be the maximum area of the throttle. The lag (shown by arrow 307) between the opening of small bore and the main bore may be due to a separation between the small bore and the main bore, such that at a range of rotations (e.g., 10-15%) of the flow control valve, the small bore is fully open but the main bore is still closed. By increasing the throttle area, more air may be supplied into the intake manifold to meet the increase in air flow demand. By having a single flow control valve, a better airflow regulation within the vacuum generation system may be achieved and system cost and complexity may be reduced.

Alternatively, in another embodiment, such as the alternate embodiment described in FIG. 1, the small bore may be opened/closed via adjustment of the aspirator shut-off valve while the main bore be opened/closed by the intake throttle. The aspirator shut-off valve and intake throttle may be coordinately controlled to first adjust the aspirator shut-off valve and then adjust the intake throttle position.

By first opening the aspirator shut-off valve (small bore) and then adjusting the position of intake throttle (main bore) based on the airflow demand, throttle area may be adjusted such that air flow rate into the intake manifold may be increased/decreased according to the engine air flow rate demand. At the same time, by adjusting the small bore followed by main bore position, vacuum may be generated via aspirators located within the throttle bypass passage as well as in the compressor bypass pathway.

Referring now to FIG. 4, an example routine 400 illustrating air flow control in vacuum consumption devices via a common aspirator shut-off of a vehicle is shown. Specifically, a position of the aspirator shut-off valve (such as the aspirator shut-off valve 138 of FIG. 1) may be adjusted based on intake manifold vacuum level. As such, routine 400 will be described in relation to the systems shown in FIG. 1, but it should be understood that similar routines may be used with other systems without departing from the scope of this disclosure. Instructions for carrying out routine 400 may be executed by a controller, such as controller 12 of FIG. 1, based on instructions stored on a memory of the controller and in conjunction with signals received from sensors of the engine system, such as the sensors described above with reference to FIG. 1. The controller may employ engine actuators of the engine system, such as the actuators of FIG. 1 to adjust engine operation, according to the routines described below.

At 402, routine 400 estimates and/or measures existing engine conditions. For example, engine conditions such as engine speed, engine load, MAP, CIP, TIP, etc. may be measured and/or estimated.

Next, at 404, routine 400 determines if the intake manifold vacuum is less than a threshold. In one example, intake manifold vacuum may be less than a threshold when the vehicle is operating in boosted conditions. In one example, intake manifold vacuum may be defined as a difference between barometric pressure and intake manifold pressure, and the threshold intake manifold vacuum may be 20 kPa.

As such, when intake manifold pressure increases toward barometric pressure, the intake manifold vacuum may decrease toward no vacuum. Conversely, as intake manifold pressure decreases away from barometric pressure, the intake manifold vacuum may increase toward vacuum of 20 kPa or higher. If it is determined that the intake manifold vacuum is less than the threshold, the method proceeds to 420.

At 420, the aspirator shut-off valve is opened. In one example, the aspirator shut-off valve 138 of FIG. 1 may be adjusted to a fully opened position to enable air flow into the throttle bypass passage. At 421, the intake throttle position may be adjusted based on desired air flow. For example, the intake throttle may be adjusted to meet operator-requested torque. If operator-requested torque is low or the engine is at idle, the intake throttle may be closed and air flow to the engine controlled by an idle throttle, or the air flow through the throttle bypass and aspirators may be sufficient to meet the air flow demand.

At 422, intake air is drawn into each aspirator coupled to a respective vacuum consumption device. As explained in FIG. 1, allowing air flow into the throttle bypass passage (via opening the aspirator shut-off valve 138) will allow air flow across aspirators 160, 161, and 162, which further generates vacuum for drawing gasses from brake booster 184, crankcase 144, and fuel vapor canister 22, respectively.

Thus, at 426, the vacuum is directed to each vacuum device as indicated. As an example, the air from brake booster 184 of FIG. 1 may be directed into common ventilation line 194 via vacuum generated by aspirator 160, into intake manifold 44. In addition, the fuel vapors/gasses of crankcase 144 may also be directed into intake manifold 44 via vacuum generated by aspirator 161 through common ventilation line 194. Further, if the airflow rate across aspirator 171 is higher than airflow rate across aspirator 161 (e.g., higher than 0.5 g/s), then a portion of the gases from crankcase 144 may also be directed to compressor bypass passage 191 via vacuum generated by aspirator 171. The fuel vapors may then mix with the fresh air in intake passage 41 before flowing into intake manifold 44. Further still, fuel vapors in the fuel vapor canister 22 may also be directed into intake manifold 44 via vacuum generated across aspirator 162. A portion of the fuel vapors from the fuel vapor canister 22 may also be directed into the compressor bypass passage 191 via vacuum generated by aspirator 171, when the airflow across aspirator 171 is higher than airflow across aspirator 162.

Returning to 404, if it is determined that intake manifold vacuum is not less than the threshold, then the method proceeds to 406. At 406, the aspirator shut-off valve may be closed. By closing the aspirator shut-off valve, little or no air flow may enter the throttle bypass passage and therefore, no vacuum may be generated across the aspirators positioned within the throttle bypass passage (e.g. aspirators 160, 161, and 162 of FIG. 1). At 407, method 400 includes adjusting the intake throttle based on desired air flow. For example, the intake throttle may be adjusted to meet operator-requested torque. If operator-requested torque is low or the engine is at idle, the intake throttle may be closed and air flow to the engine controlled by an idle throttle.

At 408, intake manifold vacuum is utilized to generate vacuum for each vacuum consumption device, and, at 410, gasses from each vacuum consumption devices are drawn via their respective check valve into the intake manifold. As such, when intake manifold vacuum is above the threshold, the fuel vapors and/or other gases from the canister and crankcase are routed to the intake manifold directly. In one example, fuel vapors and/or other gases from crankcase (e.g. crankcase 144 of FIG. 1) may be purged into intake manifold via crankcase ventilation passage 196 through check valve 156 and PCV valve 154 of FIG. 1. Further, fuel vapors from fuel vapor canister (e.g. fuel vapor canister 22 of FIG. 1) may be drawn into intake manifold via purge line 195 of FIG. 1.

In this way, the aspirator shut-off valve may be controlled to allow vacuum generation via a plurality of aspirators during certain conditions, such as during shallow intake manifold vacuum conditions. The aspirator shut-off valve may be controlled to prevent intake air bypass around an intake throttle during low air flow conditions, such as during idle.

In some examples, the air/fuel/diluent ratios in the crankcases vent gases may be modeled. This model would consider the blow-by rate, which may be empirically determined and/or learned with aging of the engine because it increases with wear. In some examples, an intake UEGO may be positioned in line with the crankcase vent gasses, to measure the blow rate (which may indicate engine health). If the fuel vapor purging is disabled, the crankcase gas effluent may be measured with the intake UEGO. Then, if the crankcase gas purging were disabled, the fuel vapor canister effluent may be measured with the intake UEGO. Once the canister is clean, the CPV may remain closed until a fuel tank refill. By placing a UEGO in the line with the crankcase vent gases, fuel vapor may be more concentrated than in the intake passage or intake manifold and thus the measurement may be of higher accuracy.

The aspirator that takes air from the throttle inlet to the compressor inlet may uncontrolled, at least in some examples. When the throttle inlet pressure is above 125 kPa absolute, it is unlikely that ejectors 160, 161, and 162 are making vacuum and thus the only aspirator generating vacuum at high TIP is aspirator 171. When MAP is above 85 kPa or TIP is below 125 kPa absolute, then ejectors 160, 161, and 162 are likely to provide useful vacuum amplification. Even below a MAP of 85 kPa, the aspirators amplify vacuum, but generally intake manifold vacuum may be the largest source of vacuum.

Referring now to FIG. 5, an example routine 500 for adjusting the position of the aspirator shut-off valve (such as the aspirator shut-off valve 138 of FIG. 1) and the position of the intake throttle (such as the intake throttle 62 of FIG. 1) based on the desired engine air flow rate is shown. Specifically, the aspirator shut-off valve may be adjusted to an open position, to allow air flow into the throttle bypass passage when the desired engine air flow is above a first threshold, and if the desired engine air flow rate is higher than a second threshold, then the intake throttle position may be adjusted, to allow air flow into both the intake passage and throttle bypass passage. Alternatively, example routine 500 may also be applied to the single flow control valve (such as flow control valve 238 of FIG. 2). In this case, the control valve may be adjusted to a first position to allow airflow through the throttle bypass passage when the desired air flow rate is higher than the first threshold and adjusted to a second position to allow airflow from both the intake passage and the throttle bypass passage, when the desired air flow rate is higher than a second threshold. As such, routine 500 will be described in relation to the engine system 100 and 200 shown in FIGS. 1-2, but it should be understood that similar routines may be used with other systems without departing from the scope of this disclosure.

At 502, routine 500 estimates and/or measures existing engine conditions. For example, engine conditions such as engine speed, engine load, MAP, CIP, TIP, etc. may be measured and/or estimated. At 504, it may be determined whether the desired air flow rate is greater than a first threshold. In one example, the first threshold may be the level of air flow rate when the vehicle is in idle. If the desired air flow rate is greater than the first threshold, then the method proceeds to 520.

At 520, the aspirator shut-off valve is opened with the intake throttle at a fully closed position. Alternatively, if a single flow control valve is used, then it may be adjusted to a first position. By opening the aspirator shut-off valve with intake throttle fully closed (or adjusting the aspirator flow control valve to the first position), air flow may enter the throttle bypass passage, which leads to increased airflow rate across aspirators 160, 161, and 162. Vacuum is then generated within the above mentioned aspirators, which allow air from brake booster 184 and fuel vapors and/or other gases from crankcase 144 and fuel vapor canister 22 to be purged via common ventilation line 194 into intake manifold 44.

At 522, it may be determined if the desired air flow rate is higher than a second threshold, where second threshold is higher than the first threshold. The second threshold may be relatively low engine air flow, such as would be observed during low engine speeds and/or loads. If the desired air flow rate is not higher than a second threshold, which means that the desired engine air flow rate may be satisfied by adjusting the position of the aspirator shut-off valve alone (or by adjusting the flow control valve to a first position alone), then the method proceeds to 523 where the aspirator shut-off valve position is adjusted based on engine air flow rate, with the throttle fully closed and the method may proceed to 526.

In contrast, if the desired air flow rate is higher than a second threshold, then the method proceeds to 524, where the intake throttle position is adjusted based on the desired engine air flow rate with the aspirator shut-off valve maintained at the fully open position. Alternatively, if a single flow control valve is used, then it may be adjusted to a second position (with larger opening than the first position). By opening both the aspirator shut-off valve and the intake throttle, fresh air from the intake (e.g., intake passage 41 of FIG. 1) may enter the intake manifold via boost chamber (e.g., boost chamber 193 of FIG. 1). In addition, air flow into intake manifold (e.g., intake manifold 44 of FIG. 1) may be increased via air drawn from the various vacuum consumption devices via vacuum generated by opening aspirator shut-off valve.

At 526, intake air is drawn into each aspirator coupled to each vacuum consumption devices via the throttle bypass passage. As explained in FIGS. 1-2, allowing air flow into the throttle bypass passage (via opening the aspirator shut-off valve or adjusting the aspirator flow control valve to first position) will allow air flow across aspirators (such as aspirators 160, 161, and 162 of FIGS. 1-2), which further generates vacuum for drawing gases from brake booster, crankcase, and fuel vapor canister, respectively.

Thus, at 530, the vacuum is directed to each vacuum device as indicated. As an example, the air from brake booster 184 of FIG. 1-2 may be directed into common ventilation line 194 via vacuum generated by aspirator 160, into intake manifold 44. In addition, the fuel vapors of crankcase 144 may also be directed into intake manifold 44 via vacuum generated by aspirator 161 through common ventilation line 194. Further, if the airflow rate across aspirator 171 is higher than airflow rate across aspirator 161 (e.g., higher than 0.5 g/s), then a portion of the gases from crankcase 144 may also be directed to compressor bypass passage 191 via vacuum generated by aspirator 171. The fuel vapors may then mix with the fresh air in intake passage 41 before flowing into intake manifold 44. Further still, fuel vapors in the fuel vapor canister 22 may also be directed into intake manifold 44 via vacuum generated across aspirator 162. A portion of the fuel vapors from the fuel vapor canister 22 may also be directed into the compressor bypass passage 191 via vacuum generated by aspirator 171, when the airflow across aspirator 171 is higher than airflow across aspirator 162. Thus, by first opening the aspirator shut-off valve and then adjusting the position of intake throttle based on the airflow demand, a desired amount of air may be provided into the intake manifold while providing vacuum during shallow manifold vacuum conditions via the aspirators 160, 161, and 162.

At 530, if a PCV valve is present, vacuum to crankcase ventilation system may be optionally adjusted by adjusting PCV valve. As described in FIG. 2, a PCV valve (such as PCV valve 288) may be coupled to crankcase 144 to better regulate air flow by restricting the flow of ventilating air during a range of engine speed/load conditions when the flow control valve is adjusted to the second position. The vacuum source occurs at variable levels and may be controlled appropriately to control the crankcase gasses ingested into the engine.

Returning to 504, if the desired air flow rate is not higher than a first threshold, then at 506, the aspirator shut-off valve and intake throttle may be closed. Alternatively, if a single flow control valve is used, then the flow control valve may be adjusted to a closed position. In one example, an idle bypass throttle may control intake air flow and the intake manifold vacuum may be sufficient to meet vacuum demand of the vacuum consumption devices. By closing the aspirator shut-off valve, little or no air flow may enter the throttle bypass passage and therefore, no vacuum may be generated across the aspirators positioned within the throttle bypass passage (e.g. aspirators 160, 161, and 162 of FIG. 1).

At 508, intake manifold vacuum is utilized to generate vacuum for each vacuum consumption device, and, at 510, gasses from each vacuum consumption devices are drawn via their respective check valve into the intake manifold. As mentioned previously, when the air flow rate is lower than a first threshold, the vehicle may be in idle condition and therefore, the intake manifold vacuum may be high. As such, the fuel vapors and/or other gases from the canister and crankcase may be routed to the intake manifold directly. In one example, fuel vapors and/or other gases from crankcase (e.g. crankcase 144 of FIG. 1) may be purged into intake manifold via crankcase ventilation passage 196 through check valve 156 and PCV valve 154 of FIG. 1. Further, fuel vapors from fuel vapor canister (e.g. fuel vapor canister 22 of FIG. 1) may be drawn into intake manifold via purge line 195 of FIG. 1.

Figure 6:
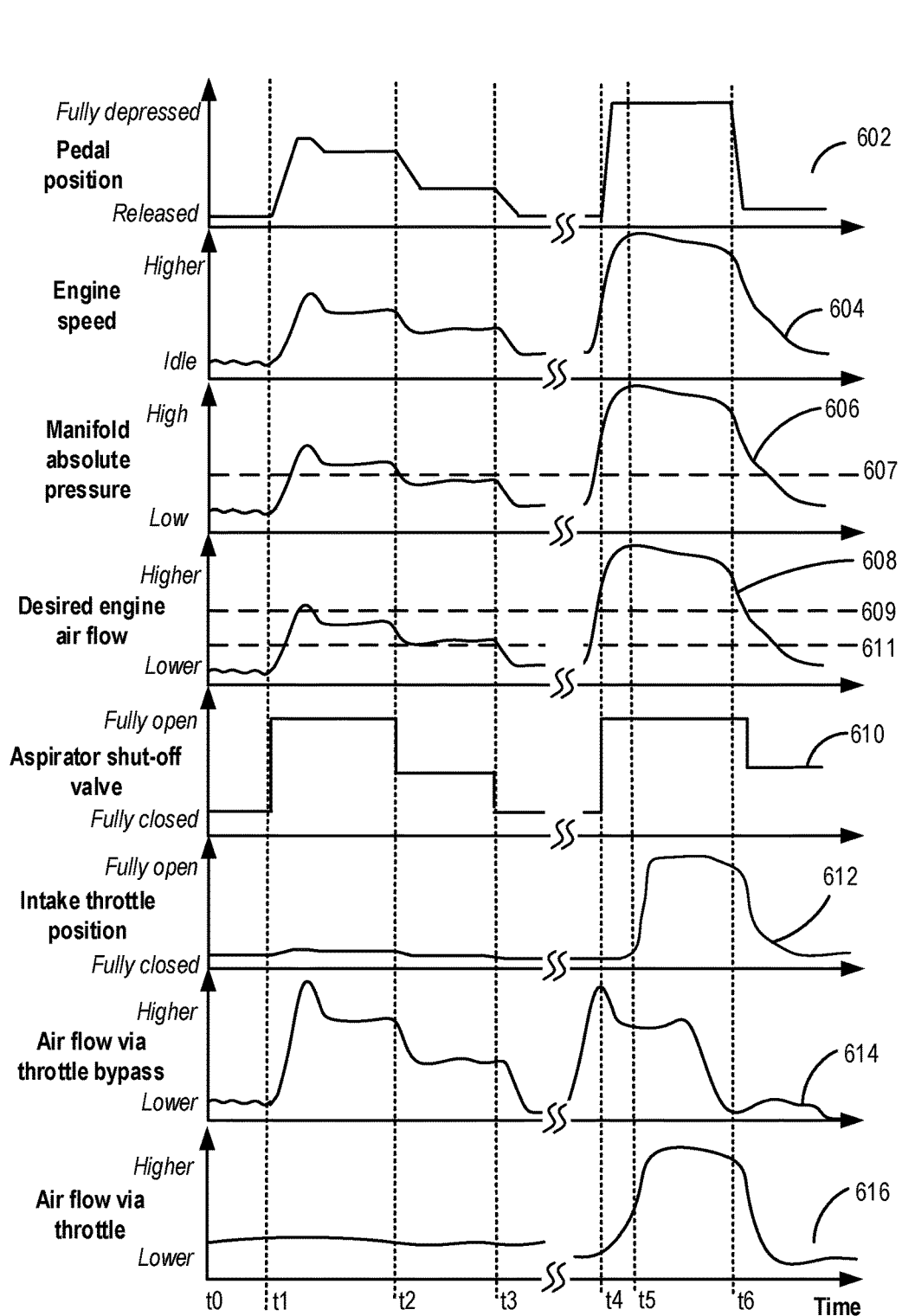
FIG. 6 shows an example operation of the engine system of FIG. 2.

Referring now to FIG. 6, an example operating mechanism of the mechanically-linked aspirator shut-off valve and intake throttle (such as the aspirator shut-off valve 138 and intake throttle 62 of FIG. 1) is shown. Map 600 includes pedal position at plot 602, engine speed at plot 604, manifold absolute pressure (MAP) at plot 606, desired engine air flow rate at plot 608, aspirator shut-off valve position at plot 610, the intake throttle position at plot 612, air flow rate via throttle bypass passage at plot 614, and air flow rate via intake passage at plot 616.

Line 607 represents barometric pressure (BP). Lines 609 and 611 represent a first and second threshold of the desired engine air flow rate, respectively. All the above plots are plotted against time, time being plotted along the x-axis. Further, time increases from the left of the x-axis towards the right.

Map 600 includes two drive cycles: a first drive cycle between t0 and t3, and a separate and distinct second drive cycle from t4 through t6. The first drive cycle includes a drive cycle when the desired engine air flow rate is above a first threshold but lower than a second threshold. The second drive cycle includes an example drive cycle when desired engine flow rate is above a second threshold.

Between t0 and t1, the engine may be operating at idle (e.g., non-boosted) as shown by plot 604 for engine speed, and the pedal may be fully released (plot 602) and the desired air flow rate (plot 608) is lower than a first threshold (line 611). At low engine flow rate, pressure in the intake manifold may be significantly lower than BP (line 607) enabling a deep vacuum in the intake manifold. As such, the vacuum is generated in the intake manifold may be high enough to draw gases from each consumption devices such as a brake booster, crankcase, and fuel vapor canister into the intake manifold via their respective check valve. In one example, fuel vapors and/or other gases from crankcase (e.g. crankcase 144 of FIG. 1) may be purged into intake manifold via crankcase ventilation passage 196 through check valve 156 and solenoid valve 154 of FIG. 1. Further, fuel vapors from fuel vapor canister (e.g. fuel vapor canister 22 of FIG. 1) may be drawn into intake manifold via purge line 195 of FIG. 1. Thus, at deep intake manifold vacuum level, the aspirator shut-off valve and intake throttle may be adjusted to a closed position (as shown at plot 610 and 612, respectively), such that air flow rate via throttle bypass (plot 614) and air flow via intake passage (plot 614) may be kept at a minimal level. Intake air may be provided to the engine via an idle throttle, for example.

At t1, a tip-in may occur as the accelerator pedal is depressed resulting in a higher torque demand. For example, the vehicle may be launching from idle at a traffic signal. MAP is increased to above BP (plot 606) such that the intake manifold vacuum decreases. Since the torque demand increases, the desired engine air flow rate is also increased. In the depicted example, the desired engine air flow rate is increased to above a first threshold but is lower than a second threshold (plot 608. In response to the desired engine air flow rate above the first threshold but lower than the second threshold, the controller may be configured to open the aspirator shut-off valve (plot 612) with the intake throttle maintained at a closed position (plot 614). In one example, aspirator shut-off valve may be adjusted based on the air flow rate, while the intake throttle is maintained at a relatively closed position. By adjusting the aspirator shut-off valve based on the air flow rate and maintaining the intake throttle at a closed position, fresh air from the intake may enter the intake manifold via the throttle bypass passage. Further, intake air may be drawn into each aspirator coupled to each vacuum consumption devices via throttle bypass passage and thus increasing the air flow rate in the throttle bypass (plot 614). Vacuum may then be generated across the aspirators positioned within the throttle bypass (such as aspirators 160, 161, and 162 of FIGS. 1-2), which then be supplied to each vacuum consumption device. Since the intake throttle is in a closed position, a small amount or no air may flow through via intake passage (plot 616).

Between t2 and t3, a tip-out occurs such that the engine speed decreases, which further decreases the desired engine flow rate and MAP. However, since the desired airflow rate is still higher than the first threshold, the aspirator shut-off valve is maintained open and may be adjusted to a more closed position based on the lower air flow rate (plot 610), and the intake throttle is maintained at a closed position. As a result, the air flow rate via throttle bypass decreases (plot 614) corresponding to the adjustment of the aspirator shut-off valve.

Between t4-t6, a new drive cycle may begin where the engine speed increases with the pedal fully depressed. As such, at t4, the vehicle may be accelerated and may be boosted as shown by the MAP being higher than BP (plot 606). The torque demand at t4 is much higher than the torque demand at t2, such that the desired engine air flow rate is higher than the second threshold (plot 608). In response to the desired engine flow demand higher than the second threshold, the controller may be configured to first adjust the aspirator shut-off valve to a fully open position as shown at plot 610. Accordingly, the air flow rate via throttle bypass increases (plot 614). However, the desired engine flow rate may not be met by fully opening the aspirator shut-off valve alone, thus, at t5, intake throttle position is adjusted to a more open position in order to meet the increase in air flow rate demand. Consequently, the air flow rate via the intake passage increases (plot 616) with the opening of the intake throttle position. Thus, by opening both the aspirator shut-off valve and the intake throttle, fresh air from the intake (e.g., intake passage 41 of FIG. 1) may enter the intake manifold via boost chamber (e.g., boost chamber 193 of FIG. 1). In addition, air flow into intake manifold (e.g., intake manifold 44 of FIG. 1) may be increased via air drawn from the various vacuum consumption devices via vacuum generated by opening aspirator shut-off valve. By first opening the aspirator shut-off valve and then adjusting the position of intake throttle based on the airflow demand, a desired amount of air may be provided into the intake manifold while providing vacuum during shallow manifold vacuum conditions via the aspirators (e.g., aspirators 160, 161, and 162 of FIG. 1).

At t6, the pedal may be released and engine speed may be reduced as engine operation with a low speed/load condition is initiated. For example, the vehicle may be driven on city streets at lower speeds. Since MAP is significantly lower than BP at t6, and desired air flow rate decreases to a level lower than the first threshold, the intake throttle may be closed and air flow demands may be met by adjusting the aspirator shut-off valve.

FIGS. 1-2 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

The technical effect of controlling air flow through each of a plurality of aspirators coupled across an intake throttle with a single valve is that desired air flow and vacuum generation may be achieved while lowering system cost and complexity.

In another representation, a system includes an engine, an intake manifold coupled to the engine, an intake throttle positioned in an intake passage upstream of the intake manifold, and a throttle bypass passage around the intake throttle. The system further includes a brake booster aspirator, a crankcase ventilation aspirator, and a fuel vapor purge system aspirator each positioned in respective parallel branch passages of the throttle bypass passage. The system further includes an aspirator shut-off valve positioned in the throttle bypass passage. The aspirator shut-off valve is configured to open during conditions where vacuum generation in the brake booster aspirator, crankcase ventilation aspirator, and fuel vapor purge aspirator is desired, such as during shallow intake manifold vacuum conditions. The aspirator shut-off valve is configured to close during conditions where vacuum generation in the brake booster aspirator, crankcase ventilation aspirator, and fuel vapor purge aspirator is not desired, such as during deep intake manifold vacuum conditions. Further, the aspirator shut-off valve may be configured to close during low intake air flow conditions where intake air flow around the intake throttle is not desired (such as during idle).

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
during a first condition,
first opening a common aspirator shut-off valve to direct intake air through a first aspirator and a second aspirator each coupled in parallel across an intake throttle, while maintaining the intake throttle closed,
supplying vacuum generated by the first aspirator to a first vacuum consumption device as demanded and supplying vacuum generated by the second aspirator to a second vacuum consumption device as demanded, and
then opening the intake throttle as an intake air flow demand increases; and
responsive to a second condition,
closing the common aspirator shut-off valve and supplying intake manifold vacuum to the first and second vacuum consumption devices as demanded.

2. The method of claim 1, wherein the first condition comprises intake manifold vacuum below a threshold vacuum and wherein the second condition comprises intake manifold vacuum above the threshold vacuum.

3. The method of claim 2, wherein opening the intake throttle as the intake air flow demand increases comprises, responsive to the intake air flow demand reaching a threshold demand, opening the intake throttle and adjusting the intake throttle based on the intake air flow demand.

4. The method of claim 1, wherein the first condition comprises the intake air flow demand at or above a threshold demand and the second condition comprises the intake air flow demand below the threshold demand.

5. The method of claim 1, wherein closing the common aspirator shut-off valve comprises blocking a flow of intake air through the first aspirator and the second aspirator.

6. A system, comprising:
an aspirator shut-off valve fluidically connecting an intake manifold of an engine to each of a brake booster aspirator, a crankcase ventilation aspirator, and a fuel vapor purge system aspirator arranged in parallel in a throttle bypass passage coupled across an intake throttle, the aspirator shut-off valve positioned in a common ventilation line coupled to the intake manifold and a respective downstream end of each of the brake booster aspirator, the crankcase ventilation aspirator, and the fuel vapor purge system aspirator, the brake booster aspirator fluidly coupled to a brake booster via a first passage, the crankcase ventilation aspirator fluidly coupled to a crankcase of the engine via a second passage, and the fuel vapor purge system aspirator fluidly coupled to a fuel vapor canister via a third passage.

7. The system of claim 6, wherein a respective upstream end of each of the brake booster aspirator, the crankcase ventilation aspirator, and the fuel vapor purge system aspirator is fluidically coupled to an intake passage downstream of a compressor and upstream of the intake throttle via a conduit.

8. The system of claim 7, wherein the conduit is coupled to a compressor bypass passage fluidly coupled to the intake passage upstream of the compressor, and wherein an additional aspirator is positioned in the compressor bypass passage, the additional aspirator configured to supply vacuum to the crankcase and to the fuel vapor canister.

9. The system of claim 6, further comprising a controller storing instructions executable by the controller to:
open the aspirator shut-off valve responsive to intake manifold vacuum being lower than a threshold vacuum;
close the aspirator shut-off valve responsive to intake manifold vacuum being at or greater than the threshold vacuum; and
adjust a position of the intake throttle based on an intake air flow demand.

10. A method, comprising:
opening an aspirator shut-off valve responsive to a level of intake manifold vacuum being less than a threshold vacuum, the aspirator shut-off valve positioned to control a flow of intake air through each of a brake booster aspirator, a crankcase ventilation aspirator, and a fuel vapor purge system aspirator arranged in parallel in a throttle bypass passage;
when the aspirator shut-off valve is open, directing intake air through the throttle bypass passage to an intake manifold, including directing the intake air through the brake booster aspirator, the crankcase ventilation aspirator, and the fuel vapor purge system aspirator; and
supplying vacuum generated by the brake booster aspirator to a brake booster vacuum reservoir via a first passage coupled between the brake booster aspirator and the brake booster vacuum reservoir, supplying vacuum generated by the crankcase ventilation aspirator to an engine crankcase via a second passage coupled between the crankcase ventilation aspirator and the engine crankcase, and supplying vacuum generated by the fuel vapor purge system aspirator to a fuel vapor canister via a third passage coupled between the fuel vapor purge system aspirator and the fuel vapor canister.

11. The method of claim 10, further comprising:
responsive to the level of intake manifold vacuum being equal to or greater than the threshold vacuum, closing the aspirator shut-off valve; and
when the aspirator shut-off valve is closed, blocking intake air from flowing through the throttle bypass passage.

12. The method of claim 11, further comprising adjusting a position of an intake throttle based on an intake air flow demand.

13. The method of claim 1, wherein opening the common aspirator shut-off valve comprises opening the common aspirator shut-off valve to direct intake air through a third aspirator coupled in parallel with the first aspirator and the second aspirator, wherein the method further comprises supplying vacuum generated by the third aspirator to a third vacuum consumption device as demanded, and wherein the first, second, and third vacuum consumption devices include a brake booster vacuum reservoir, an engine crankcase, and a fuel vapor canister.

14. The method of claim 13, wherein supplying vacuum generated by the first aspirator, the second aspirator, and the third aspirator to the first, second, and third vacuum consumption devices as demanded includes when the common aspirator shut-off valve is open, supplying vacuum generated by the first aspirator to the brake booster vacuum reservoir, supplying vacuum generated by the second aspirator to the engine crankcase, and supplying vacuum generated by the third aspirator to the fuel vapor canister.

15. The method of claim 1, further comprising:
when the common aspirator shut-off valve is closed, blocking intake air from flowing through a throttle bypass passage, the throttle bypass passage including the first aspirator and the second aspirator arranged in parallel.

16. The method of claim 11, wherein opening the aspirator shut-off valve responsive to the level of intake manifold vacuum being less than the threshold vacuum comprises opening the aspirator shut-off valve responsive to the level of intake manifold vacuum being less than 20 kPa.

17. The system of claim 6, wherein the brake booster aspirator, the crankcase ventilation aspirator, and the fuel vapor purge system aspirator are each configured to flow intake air at different flow rates.

18. The method of claim 11, further comprising, when the aspirator shut-off valve is closed, supplying vacuum generated by an additional aspirator coupled in a compressor bypass passage to the engine crankcase via a fourth passage coupled between the additional aspirator and the engine crankcase and to the fuel vapor canister via a fifth passage coupled between the additional aspirator and the fuel vapor canister.

19. The method of claim 18, further comprising, when the aspirator shut-off valve is open and an airflow rate across the additional aspirator is higher than an airflow rate across the crankcase ventilation aspirator, drawing a portion of gases from the crankcase to the compressor bypass passage via the vacuum generated by the additional aspirator.

* * * * *